(12) United States Patent
Schube et al.

(10) Patent No.: US 7,878,717 B2
(45) Date of Patent: Feb. 1, 2011

(54) OPTICAL WAVEGUIDE PLUG PART

(75) Inventors: Frank Schube, Engelskirchen (DE);
Dirk Bechtel, Bielefeld (DE);
Franz-Joseph Kucharski, Gütersloh (DE)

(73) Assignees: Escha Bauelemente GmbH, Halver (DE); Beckhoff Automation GmbH, Verl (DE)

( * ) Notice: Subject to any disclaimer, the term of this patent is extended or adjusted under 35 U.S.C. 154(b) by 0 days.

(21) Appl. No.: 12/298,796

(22) PCT Filed: Apr. 23, 2007

(86) PCT No.: PCT/EP2007/003551
§ 371 (c)(1),
(2), (4) Date: Feb. 4, 2009

(87) PCT Pub. No.: WO2007/124883
PCT Pub. Date: Nov. 8, 2007

(65) Prior Publication Data
US 2009/0190885 A1    Jul. 30, 2009

(30) Foreign Application Priority Data
Apr. 28, 2006 (DE) .................. 10 2006 019 872

(51) Int. Cl.
*G02B 6/36* (2006.01)
*G02B 6/00* (2006.01)
(52) U.S. Cl. .................... 385/81; 385/53; 385/100; 385/136
(58) Field of Classification Search .......... 385/53, 385/56, 60, 62, 81, 87, 100, 136, 137, 134
See application file for complete search history.

(56) References Cited

U.S. PATENT DOCUMENTS

| | | | | |
|---|---|---|---|---|
| 4,645,295 A | * | 2/1987 | Pronovost | 385/55 |
| 4,679,895 A | * | 7/1987 | Huber | 385/87 |
| 4,784,456 A | | 11/1988 | Smith | 385/53 X |
| 5,121,455 A | | 6/1992 | Palecek | 385/69 |
| 5,692,089 A | * | 11/1997 | Sellers | 385/137 |

(Continued)

FOREIGN PATENT DOCUMENTS

| | | | |
|---|---|---|---|
| DE | 38 10 044 A1 | 3/1988 | |
| DE | 90 10 357 U1 | 7/1990 | |
| DE | 101 31 273 C1 | 6/2001 | |
| EP | 0290188 A2 | 11/1988 | 385/53 X |

OTHER PUBLICATIONS

English Translation of the International Preliminary Report on Patentability (IPER), International Application No. PCT/EP2007/003551, dated Dec. 24, 2008.

(Continued)

*Primary Examiner*—Brian M Healy
(74) *Attorney, Agent, or Firm*—Kevin P. Radigan, Esq.; Heslin Rothenberg Farley & Mesiti P.C.

(57) ABSTRACT

The invention relates to an optical waveguide plug part of an optical waveguide plug connector for an optical waveguide, which has a fiber and a sheath, with a contact carrier for receiving the optical waveguide and at least one clamping part for securing the optical waveguide in the contact carrier, wherein the clamping part as a first clamping section for clamping the sheath of the optical waveguide and a second clamping section for clamping the fiber of the optical waveguide.

46 Claims, 7 Drawing Sheets

U.S. PATENT DOCUMENTS

| | | | | |
|---|---|---|---|---|
| 6,081,642 | A | 6/2000 | Asada | 385/59 |
| 6,434,314 | B1 * | 8/2002 | Gatica et al. | 385/136 |
| 6,652,157 | B2 | 11/2003 | Schmidt et al. | 385/88 |
| 2005/0013547 | A1 * | 1/2005 | Rossi et al. | 385/53 |
| 2009/0190885 | A1 * | 7/2009 | Schube et al. | 385/81 |

OTHER PUBLICATIONS

German Search Report for DE 10 2006 019 872.7, dated Nov. 17, 2006.

PCT Written Opinion for PCT/EP2007/003351.

* cited by examiner

OPTICAL WAVEGUIDE PLUG PART

CROSS REFERENCE TO RELATED APPLICATIONS

This application is a national stage filing under section 371 of International Application No. PCT/EP2007/003551, filed on Apr. 23, 2007, and published in German on Nov. 8, 2007, as WO 2007/124883 A1, and which claims priority of German application No. 10 2006 019 872.7, filed on Apr. 28, 2006, the entire disclosure of these applications being hereby incorporated herein by reference.

TECHNICAL FIELD

The invention relates to an optical waveguide plug part and connector for an optical waveguide.

Such an optical waveguide plug part is disclosed, for example, in DE 101 26 659 A1.

BACKGROUND OF THE INVENTION

In order to design the plug part so that it is water-tight, the prior art proposes screwing the optical waveguide into an inner thread which is formed in the interior of the optical waveguide plug part and cuts into the insulation of the optical waveguide.

Although the known optical waveguide plug part creates a good seal and a secure retention of the optical waveguide in the optical waveguide plug part, it has the disadvantage that the production is expensive and difficult owing to the torque to be exerted on the optical waveguide.

Furthermore, optical waveguide plug parts are known in which a metal part is arranged in an opening in the optical waveguide plug part and clamps the core of the optical waveguide. Since no sealing elements are provided, these known optical waveguide plug parts are not water-tight. Moreover, in the case of these known optical waveguide plug parts, the optical waveguide strain relief brought about by the clamping part is small.

SUMMARY OF THE INVENTION

It is the object of the invention to provide an optical waveguide plug part according to the precharacterising clause of claim 1, which can be easily produced and has a good strain relief.

The object of the invention is achieved by an optical waveguide plug part according to the features of claim 1. Advantageous developments of the invention are stated in the dependent claims.

According to one embodiment of the invention, an optical waveguide plug part comprises an optical waveguide plug connector for an optical waveguide, which has a fiber and a covering, a contact carrier for receiving the optical waveguide and at least one clamping part for securing the optical waveguide in the contact carrier, the clamping part having a first clamping section for clamping the covering of the optical waveguide and a second clamping section for clamping the fiber of the optical waveguide.

This has the advantage of simple assembly and better strain relief. In the case of optical waveguides having strain relief fibers, these can likewise be better secured via the blade elements. It is also possible in principle to use a plurality of clamping parts which in each case have two clamping sections or one clamping section. An embodiment having one clamping section is preferred because assembly and sealing are facilitated.

According to the invention, the first clamping section may have blade elements for cutting into the covering of the optical waveguide. Alternatively or additionally, the second clamping element may have blade elements for cutting into the fiber of the optical waveguide. Thus, the blade elements may preferably be substantially perpendicular to the direction in which the optical waveguide can be inserted or is inserted into the optical waveguide plug part.

According to the invention, the blade elements may have a barb-like profile in cross-section. This has the advantage that the barb profile can be formed in such a way that a tensile force exerted on the optical waveguide is counteracted. There is therefore better strain relief because the material of the covering or of the fiber insulation cannot slip so easily over the blade elements. During assembly, the blade elements can easily be cut into the covering and/or the fiber insulation if, is as preferred, the barb structure is perpendicular to the cutting direction.

It is also the object of the invention to provide an optical waveguide plug part in which the correct arrangement of the optical waveguide in the optical waveguide plug part can easily be determined and checked from outside after assembly.

This object of the invention is achieved by an optical waveguide plug part according to the features of claim 6. Advantageous developments of the invention are stated in the dependent claims.

According to one embodiment of the invention, an optical waveguide plug part of an optical waveguide plug connector for an optical waveguide which has a fiber and a covering comprises a contact carrier for receiving the optical waveguide and at least one clamping part for securing the optical waveguide in the contact carrier, the clamping part and/or the contact carrier, additionally or alternatively to the abovementioned features, being formed at least partly transparent and/or translucent.

According to the invention, the clamping part may be formed completely transparent and/or translucent.

According to the invention, the contact carrier may be formed transparent and/or translucent at least in the region of the receiving section for the clamping part.

According to the invention, the clamping part and/or the contact carrier may be provided with color marking for identification of the position of the optical waveguide in the optical waveguide plug part.

It is also the object of the invention to provide an optical waveguide plug part which can be easily produced and has good tightness.

This object of the invention is achieved by an optical waveguide plug part according to the features of claim 10. Advantageous developments of the invention are stated in the dependent claims.

According to one embodiment of the invention, an optical waveguide plug part of an optical waveguide plug connector for an optical waveguide which has a fiber and a covering comprises a contact carrier for receiving the optical waveguide and at least one clamping part for securing the optical waveguide in the contact carrier, at least one seal being arranged additionally or alternatively to the abovementioned features on the clamping part.

According to the invention, the seal may be an O-ring.

According to the invention, the clamping part may have a flange for receiving the seal.

According to the invention, the clamping part may have a groove for receiving the seal. Alternatively or additionally, the contact carrier may have a groove for receiving the seal. Alternatively or additionally, the contact carrier may have a step for receiving the seal.

According to the invention, the seal may be arranged along the opening of the contact carrier, in which opening the clamping part for securing the optical waveguide is arranged or can be arranged.

According to one embodiment of the invention, an optical waveguide plug part of an optical waveguide plug connector for an optical waveguide which has a fiber and a covering comprises a contact carrier for receiving the optical waveguide and at least one clamping part for securing the optical waveguide in the contact carrier, a (possibly further) seal which is arranged in such a way that the fiber of the optical waveguide can be inserted through the seal being provided additionally or alternatively to the abovementioned features.

This is an alternative or additional solution to the arrangement of the seal. The (further) seal is inserted into the contact carrier, and the optical waveguide is pushed or turned into the optical waveguide plug part and secured with the clamping part. Preferably, the (further) seal may be encompassed by the clamping part or may form a lateral stop.

According to the invention, the contact carrier may have a lateral opening for receiving the at least one clamping part.

According to the invention, the outer contour of the clamping part may substantially correspond to the outer contour of the contact carrier. Alternatively or additionally, the outer contour of the clamping part may be substantially flat.

According to the invention, the outer contour of the clamping part may be arched. This embodiment is particularly advantageous in the case of transparent or translucent clamping parts because the shape can advantageously be chosen so that a magnification of the position indication of the optical waveguide in the contact carrier is possible (magnifying function).

According to the invention, the contact carrier may have a cross-section which is substantially round, oval, elliptical or rectangular (preferably having rounded corners).

According to the invention, the contact carrier may have a cross-section which is asymmetrical. The asymmetrical embodiment of the cross-section has the advantage that "coding" ensures the correct positioning of the clamping part. Alternatively, the clamping part may also be completely symmetrical so that it can be correctly arranged in both directions. This facilitates assembly but means a large installation space and higher material and manufacturing costs.

According to the invention, the fiber may have a core of optically transparent material with little attenuation and a sheath which surrounds the core and has a lower refractive index than the core. An insulation is provided around the sheath. Advantageously, the optical waveguide furthermore has strain relief fibers.

According to the invention, the core may be formed from plastic or glass.

According to the invention, the contact carrier may have a tube which is preferably formed for receiving the fiber or the core of the fiber of the optical waveguide.

According to the invention, the optical waveguide plug part may have a Cap which has a passage for the optical waveguide and can preferably be connected water-tight to the contact carrier.

According to the invention, the optical waveguide plug part may be capable of being united with a counter-plug part.

According to the invention, the optical waveguide plug part may have the peg or the pegs or a receptacle part of a bayonet coupling.

According to the invention, the clamping part may be formed from metal and/or plastic.

According to the invention, the clamping part may be a diecast part.

According to the invention, the contact carrier may be formed from metal and/or plastic.

According to the invention, the clamping part may have a clamping section for clamping the fiber of the optical waveguide.

According to the invention, the cap and the contact carrier may be formed as one part.

According to the invention, the clamping part and the seal may be formed as one part.

According to the invention, the contact carrier and the seal may be formed as one part.

According to the invention, the contact carrier may have thread sections for screwing in the covering and/or the fiber of the optical waveguide. In the embodiments of the invention, this fastening and strain relief can be additionally provided with the at least two clamping sections of the clamping part. The optical waveguide is then first screwed into the optical waveguide plug part, and the clamping part is then pushed into the contact carrier, the optical waveguide being clamped. In the other embodiments of the optical waveguide plug part which do not necessarily have the two clamping sections (one clamping section for the covering or the fiber or no clamping section is required), it is likewise possible to provide such a strain relief.

The invention also relates to a strapping plug having at least one optical waveguide plug part according to the invention (or the abovementioned features).

Preferably, the strapping plug according to the invention has two optical waveguide plug parts according to the invention.

The clamping parts of the two optical waveguide plug parts can preferably be connected to one another.

According to the invention, the clamping parts of the two optical waveguide plug parts may be in the form of one piece.

According to the invention, the clamping parts of the two optical waveguide plug parts may be rigidly connected to one another.

According to the invention, the clamping parts of the two optical waveguide plug parts can be arranged opposite one another.

According to the invention, the clamping parts of the two optical waveguide plug parts may also be connected to one another in a flexible manner. This has the advantage that the distance is variable.

The invention also relates to an optical waveguide plug connector comprising an optical waveguide plug part, which comprises the abovementioned features, and a counter-plug part.

According to the invention, the counter-plug part may have a shaft for receiving the tube or the core of the optical waveguide.

BRIEF DESCRIPTION OF THE DRAWINGS

The invention is described in more detail below with reference to the working examples shown in the figures.

The following reference numerals are used in the description of the working examples:

10 optical waveguide
11 core (optically transparent material having little attenuation, e.g. quartz glass, transparent plastic) having a sheath (lower refractive index than the core; core and sheath form the "optical" fiber)
12 insulation (also fiber insulation)
13 covering (also coating or outer sheath) Strain relief fibers are preferably present between covering and insulation but are not shown in the present application for the sake of clarity.
20 cap (also sealing cap)
21 sealing lip
22 snap edge
30 contact carrier
31 tube
32 tube socket
33 bead (projecting outwards)
34 tube end (makes contact or almost makes contact with a transmission/receiving element)
35 locking element
36 recess
40 clamping part (for clamping the optical waveguide in the contact carrier and for closing the contact carrier)
41 first clamping section (for example for covering 13)
42 second clamping section (for example for insulation 12)
43 blade elements (in the first clamping section 41)
44 blade elements (in the second clamping section 42)
45 flange
46 locking element
47 wall
48 connecting element (for example of two clamping parts)
50 sealing element (O-ring)
60 base
61 base wall
62 snap edge
63 shaft
71 peg (for a bayonet coupling)
72 receptacle part (for a bayonet coupling)

DETAILED DESCRIPTION OF THE INVENTION

FIGS. 1 to 8 show a first working example of the invention.

Figure 1:
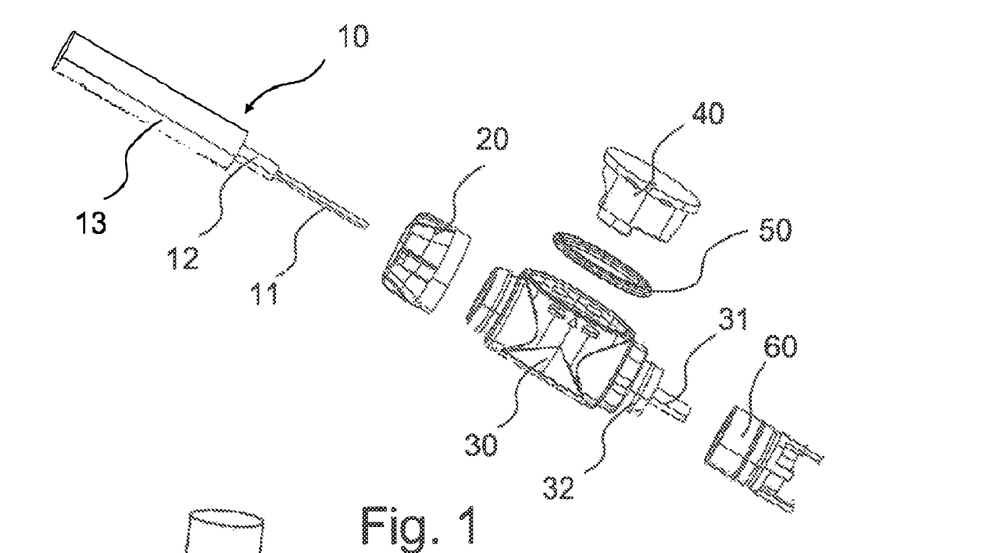
FIG. 1 shows an exploded drawing of an optical waveguide plug part having a base of a counter-plug part according to a first embodiment of the invention.
Figure 2:
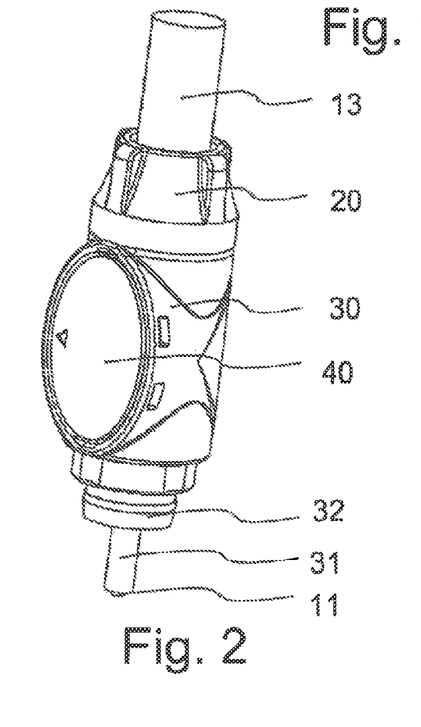
FIG. 2 shows a perspective view of the optical waveguide plug part according to FIG. 1.

An optical waveguide 10 comprises a core 11 which is surrounded by a sheath of low refractive index, around which an insulation 12 is provided. Strain relief fibers which are not shown are provided around the insulation 12. Furthermore, the optical waveguide has a covering 13.

The working example of the invention which is shown in FIG. 1 to 8 comprises a contact carrier 30 which can be fastened to the optical waveguide 10. For this purpose, the optical waveguide 10 is stripped of insulation according to the diagram in FIG. 1, the cap 20 is pushed onto the optical waveguide 10, and the optical waveguide is pushed into the contact carrier 30 so that the core 11 engages the tube 31. The clamping part 40 with the sealing element 50 is then inserted into the opening in the contact carrier 30. The optical waveguide plug part is thus sealed water-tight. In addition, the optical waveguide is held securely and firmly in the contact carrier 30 because the blade elements 43 and 44 of the two clamping sections 41 and 42, respectively, engage the insulation 12 and the covering 13, respectively.

Figure 5:
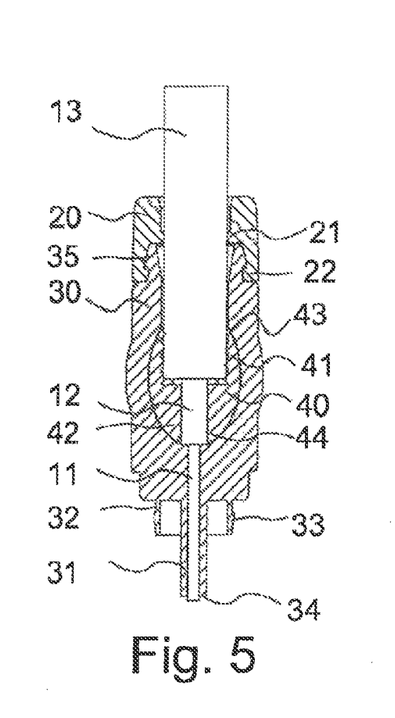
FIG. 5 shows a sectional view according to the sectional line V-V in FIG. 4.
Figure 6:
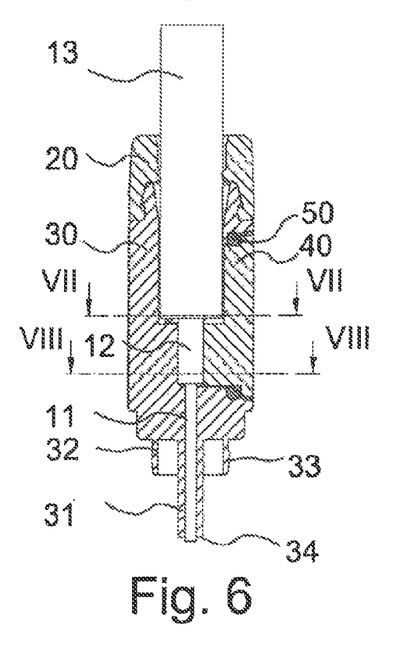
FIG. 6 shows a sectional view according to the sectional line VI-VI in FIG. 4.
Figure 7:
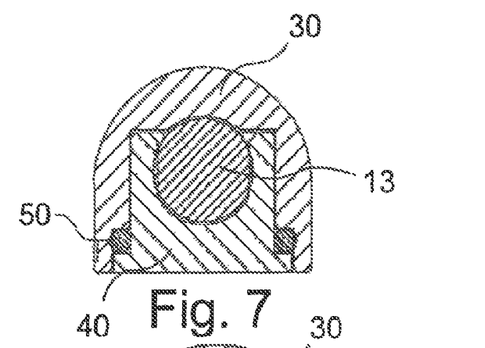
FIG. 7 shows a sectional view according to the sectional line VII-VII in FIG. 6.
Figure 8:
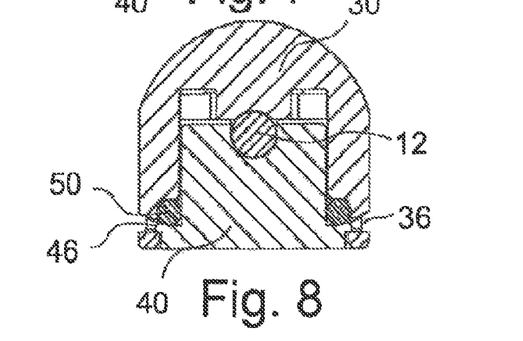
FIG. 8 shows a sectional view according to the sectional line VIII-VIII in FIG. 6.
Figure 9:
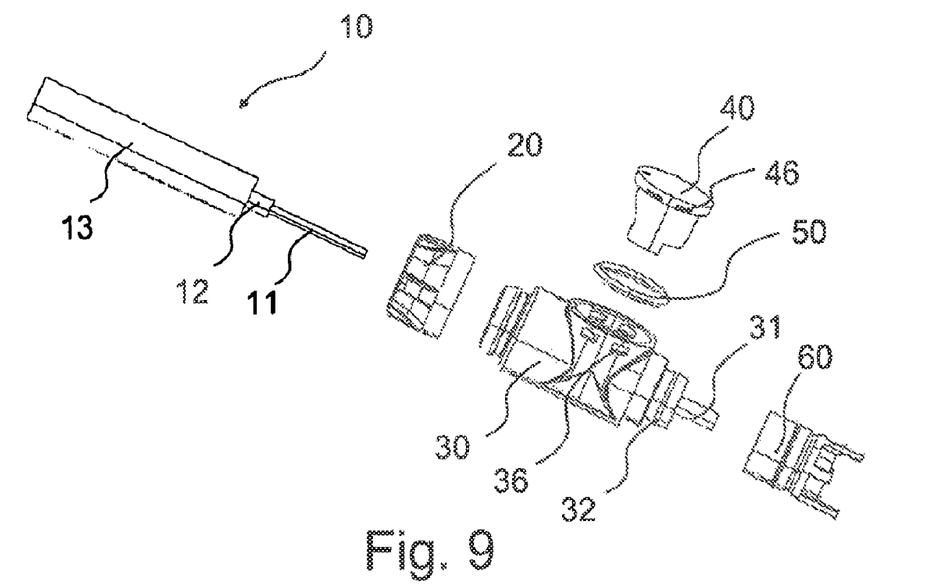
FIG. 9 shows an exploded drawing, corresponding to FIG. 1, of an optical waveguide plug part according to a further embodiment of the invention.
Figure 10:
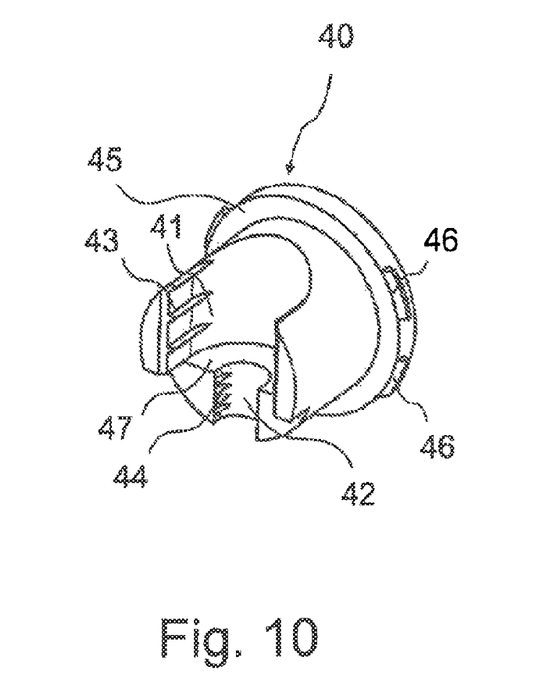
FIG. 10 shows a perspective view of the clamp fastener of the optical waveguide plug part of FIG. 9.

The clamping part 40 has an oval or elliptical cross-section. Its outer edge is provided with a flange 45 which secures the sealing element 50 on the contact carrier 30. Alternative arrangements for the sealing element are conceivable.

At its outer edge, the clamping part 40 furthermore has locking elements 46 which engage corresponding recesses 36 on the contact carrier 30 (cf. FIG. 8) in order to secure the clamping element 40 on the contact carrier.

Figure 3:
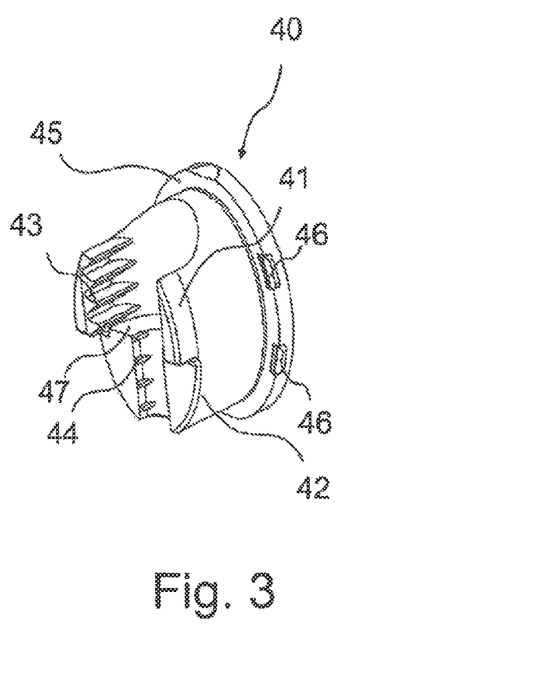
FIG. 3 shows a perspective view of the clamp fastener of the optical waveguide plug part of FIG. 1.
Figure 4:
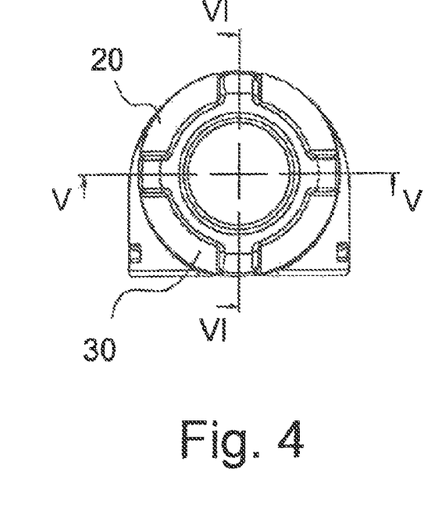
FIG. 4 shows a plan view of an optical waveguide plug connector comprising an optical waveguide plug part according to FIG. 1.

The two clamping sections 41 and 42, which are provided in each case with blade elements 43 and 44, respectively, are clearly evident in FIG. 3 and FIG. 5.

The contact carrier 30 has, at its end facing away from the optical waveguide 10, a tube socket 32 with an outward-projecting bead 33 in order to engage a corresponding counter-plug part, i.e. the base 60 shown in the other two working examples. The tube 31 has a tube end 34 which makes contact or almost makes contact with a transmission/ receiving element on insertion of the optical waveguide plug part.

The cap 20 has sealing lips 21 in order to seal the optical waveguide plug part from the optical waveguide 10. The cap 20 furthermore comprises a snap edge 22 which grips around a locking element 35 at the end of the contact carrier in order to fasten the cap 20 to the contact carrier 30.

The clamping part 40 has a wall 47 against which the optical waveguide 10 rests as tightly as possible. The clamping part 40 may be transparent or translucent so that the correct position of the optical waveguide 10 in the optical waveguide plug part can be checked and ensured from the outside after assembly is complete.

The structure of the base 60 is described with reference to the following working example (FIGS. 9 to 14).

Figures 11, 12, 13, 14:
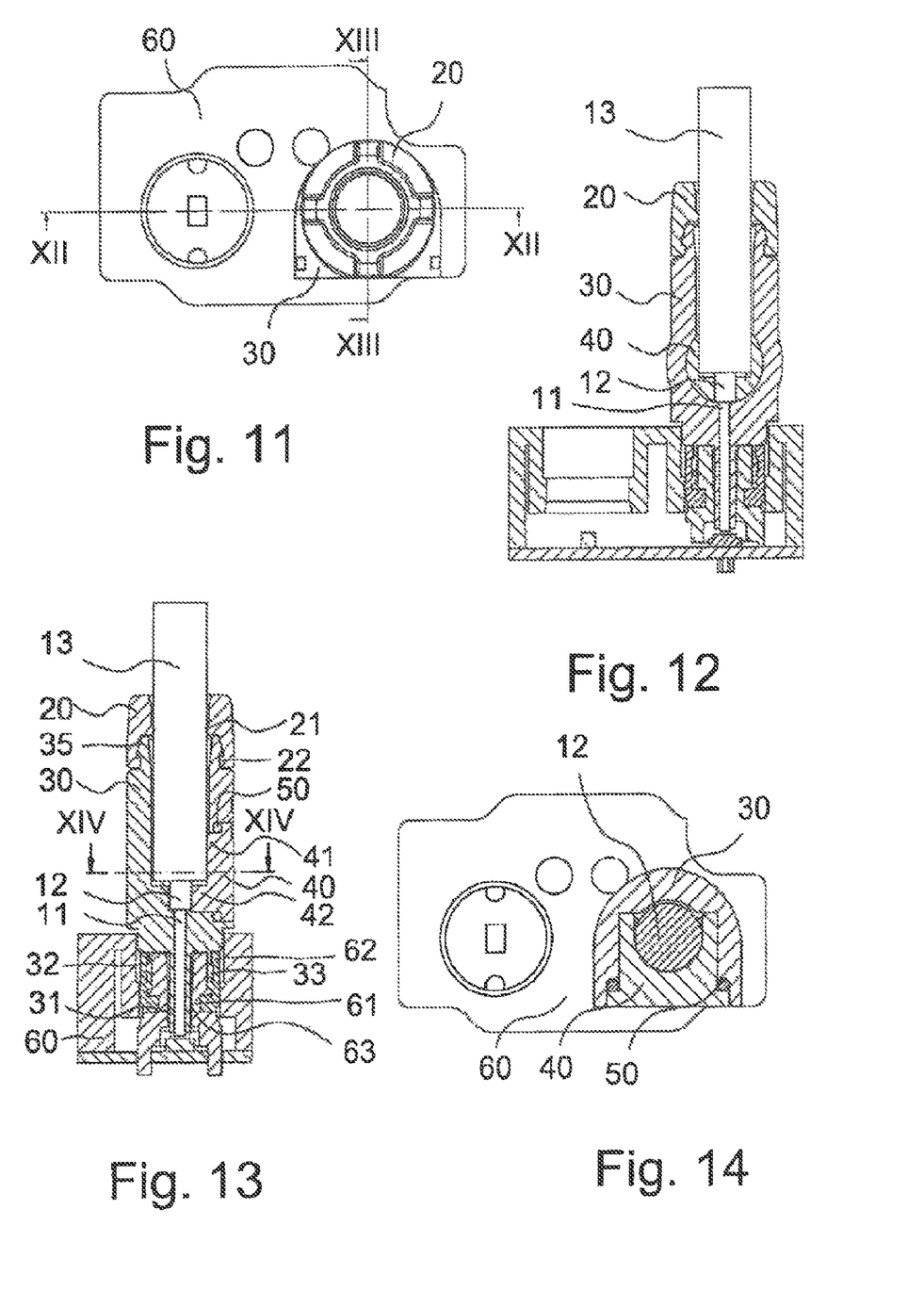
FIG. 11 shows a plan view of an optical waveguide plug connector comprising an optical waveguide plug part according to FIG. 9.
FIG. 12 shows a sectional view according to the sectional line XII-XII in FIG. 11.
FIG. 13 shows a sectional view according to the sectional line XIII-XIII in FIG. 11.
FIG. 14 shows a sectional view according to the sectional line XIV-XIV in FIG. 13.
Figure 15:
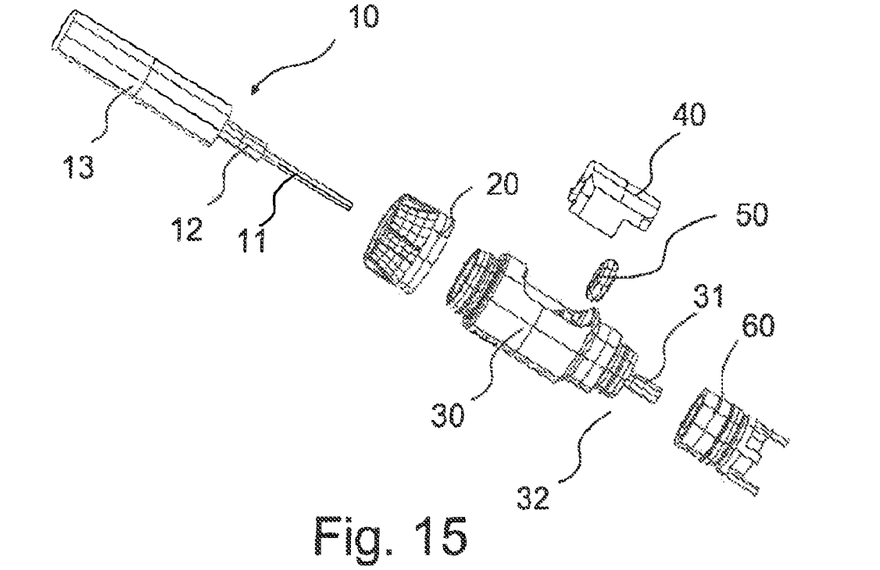
FIG. 15 shows an exploded drawing, corresponding to FIG. 1 of an optical waveguide plug part according to a further embodiment of the invention.
Figure 16:
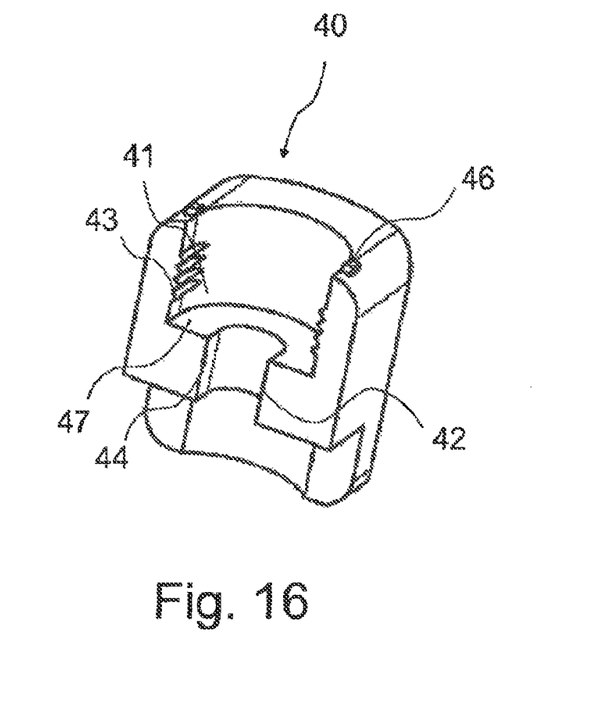
FIG. 16 shows a perspective view of the clamp fastener of the optical waveguide plug part of FIG. 15.
Figures 17, 18, 19, 20:
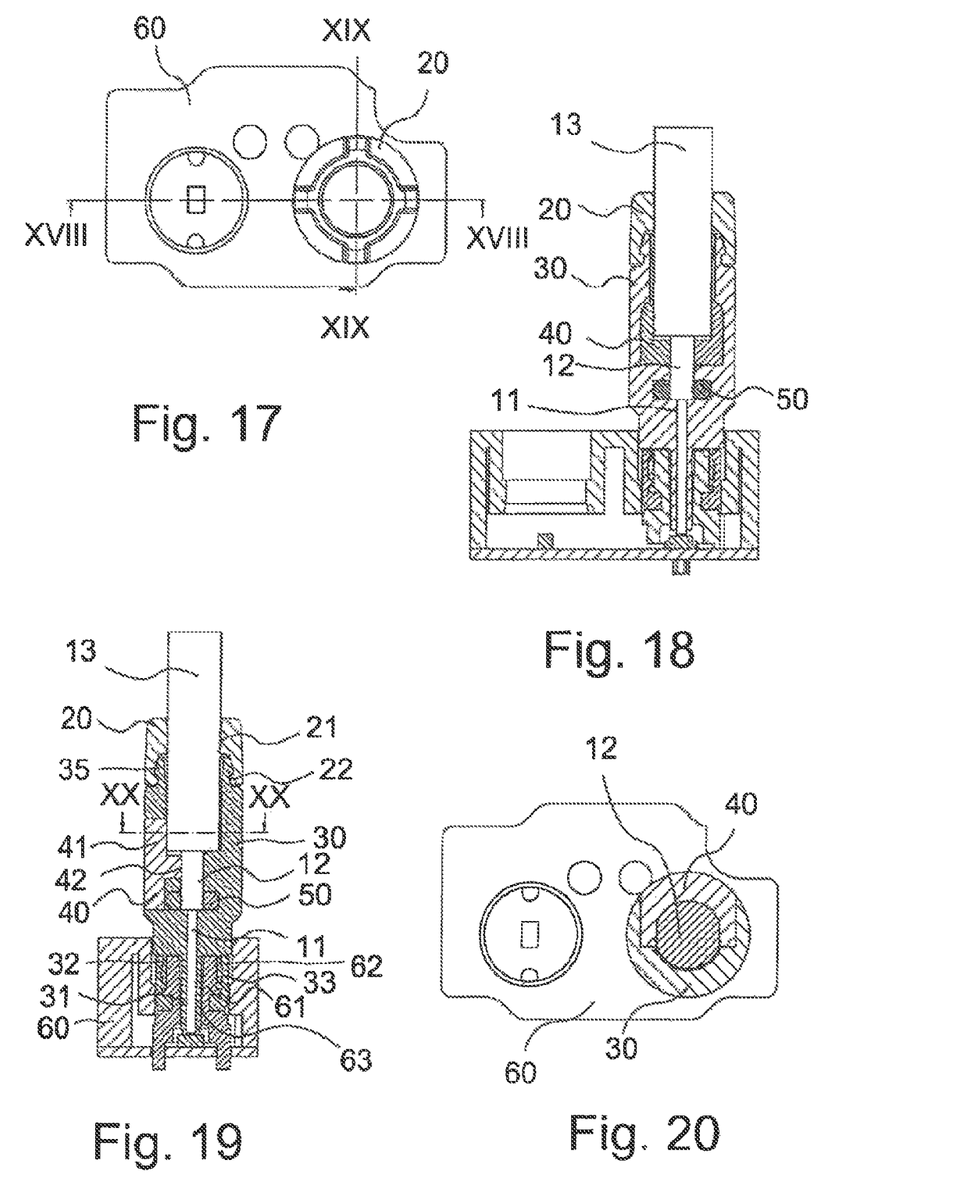
FIG. 17 shows a plan view of an optical waveguide plug connector comprising an optical waveguide plug part according to FIG. 15.
FIG. 18 shows a sectional view according to the sectional line XVIII-XVIII in FIG. 17.
FIG. 19 shows a sectional view according to the sectional line XIX-XIX in FIG. 17
FIG. 20 shows a sectional view according to the sectional line XX-XX in FIG. 19.

FIGS. 9 to 14 show a second working example of the invention. The same reference numerals are used for identical or corresponding parts. Regarding the description, reference is made to the description of the working example described with reference to FIGS. 1 to 8. Otherwise, only the differences from this working example of the invention will be described:

The working example of FIGS. 9 to 14 differs substantially from that shown in FIGS. 1 to 8 in the structure of the clamping part 40 and in the contact carrier 30 holding the clamping part 40. While the clamping part 40 of the preceding working example has an oval or elliptical cross-section (cf. FIG. 5), the clamping part 40 of the working example shown in FIGS. 9 to 14 has a round or circular cross-section (FIG. 12). Other shapes are conceivable. For example, the clamping part 40 can be arched instead of flat on the outside or can be formed to correspond to the outer contour of the contact carrier 30.

FIG. 13 shows the base 60 for receiving the optical waveguide plug part, in cross-section. The base 60 has a shaft 63 for receiving the tube 31 of the contact carrier 30. The shaft 63 is formed by the base wall 61. The base 60 furthermore comprises a snap edge 62 for securing the bead 33, which is formed on the tube socket 32 of the contact carrier 30.

FIGS. 15 to 20 show a third working example of the invention. The same reference numerals are used for identical or corresponding parts. Regarding the description, reference is made to the description of the working example described with reference to FIGS. 1 to 8. Otherwise, only the differences from this working example of the invention will be described:

FIGS. 15 to 20 show a further variant of the clamping part. In this working example, the seal 50 is arranged in such a way that the seal 50 surrounds the optical waveguide. This embodiment gives good results but is not very preferable because in principle water can travel past the clamping piece, between covering 13 and insulation 12. In this embodiment, it is therefore preferable additionally to provide a seal between the clamping piece 40 and the contact carrier 30. This embodiment furthermore has a somewhat smaller maximum achievable strain relief because, owing to the seal arrangement of the sealing element 50, the second clamping section 42 has a short construction and the clamping piece accordingly has a longer construction than in the other two working examples described above.

FIGS. 21 to 24 show possible variants of a strapping plug according to the invention.

Figure 21:
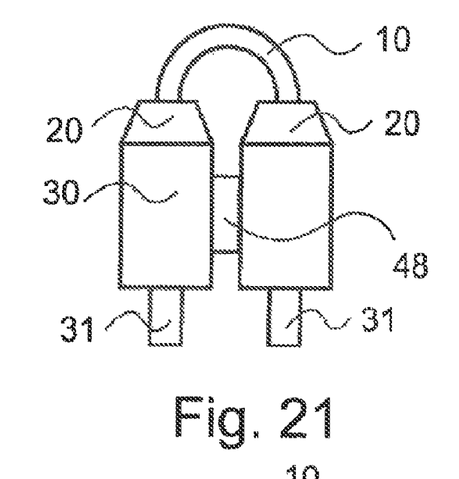
FIG. 21 shows a side view of an optical waveguide strapping plug according to an embodiment of the invention.

FIG. 21 schematically shows a strapping plug which has two optical waveguide plug parts according to the invention, which are connected to one another via an optical waveguide 10. One part serves for transmitting and the other for receiving. The two parts each have a cap 20 which is connected to a contact carrier 30. The two tubes 31 are indicated schematically. Clamping parts which are preferably formed according to the invention and are connected rigidly to one another by means of the connecting element 48 are arranged in each case and opposite to one another in the contact carriers 30.

Figure 22:
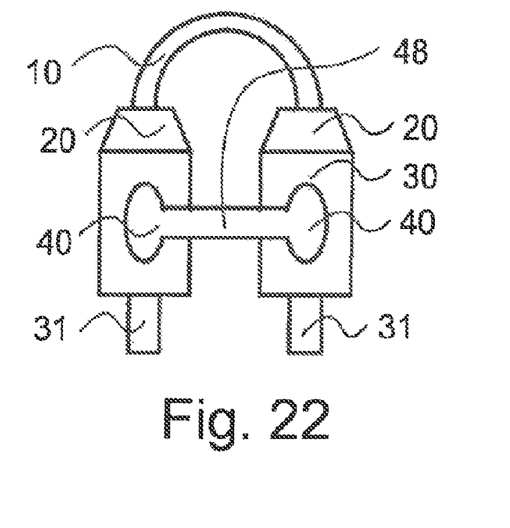
FIG. 22 shows a side view of an optical waveguide strapping plug according to a further embodiment of the invention.

FIG. 22 shows an alternative embodiment of a strapping plug, in which the clamping parts 40 are oriented parallel to one another and are connected to one another by a rigid or flexible connecting element 48.

Figure 23:
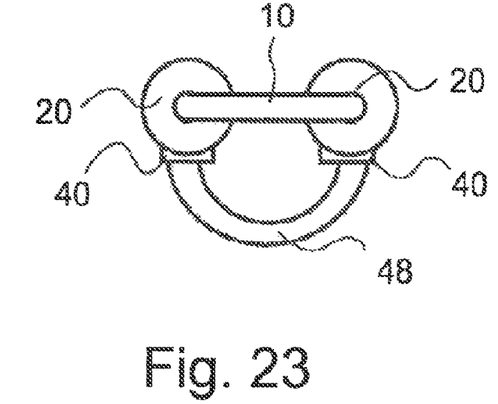
FIG. 23 shows a side view of an optical waveguide strapping plug according to a further embodiment of the invention in a contracted position.
Figure 24:
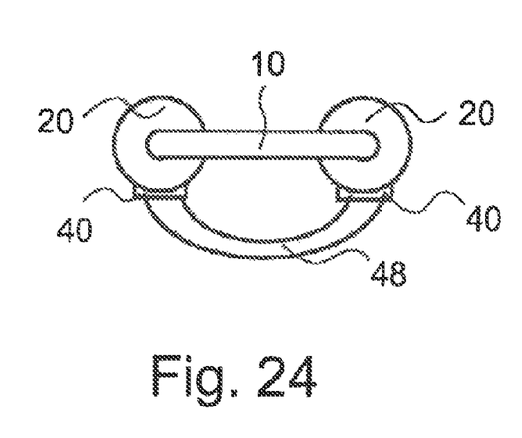
FIG. 24 shows a side view of an optical waveguide strapping plug according to a further embodiment of the invention in an extended position.

FIGS. 23 and 24 show a strapping plug having a flexible connecting element 48 for connecting the two clamping pieces, FIG. 23 showing the flexible connecting element 48 in "contracted" or compressed form while FIG. 24 shows the flexible connecting element 48 in extended form. As a result of the flexible connecting line 48, the distance between the two optical waveguide plug parts is variable and can be adapted to different environments.

Figure 25:
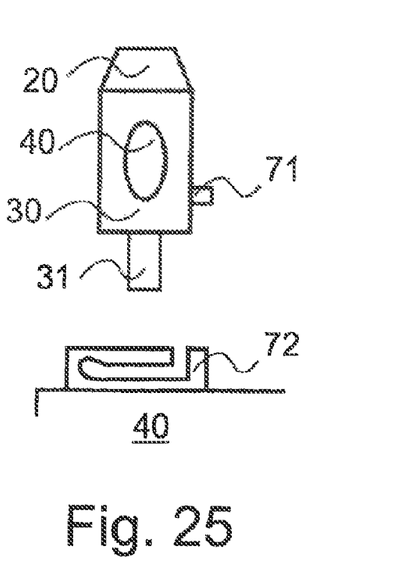
FIG. 25 shows a side view of an optical waveguide plug part according to an embodiment of the invention, comprising a bayonet coupling.

FIG. 25 schematically shows an optical waveguide plug part according to the invention, comprising a bayonet coupling which has a peg 71 and a receptacle part 72 on the base 60. Other obvious alternatives known to the person skilled in the art and intended for fastening of the optical waveguide plug part to the base are conceivable.

It is clear that alternatives obvious to the person skilled in the art on studying the documents and equivalent solutions should also be within the scope of protection of the present application.

What is claimed is:

1. Optical waveguide plug part of an optical waveguide plug connector for an optical waveguide, which has a fiber surrounded by a covering, the optical waveguide plug part comprising a contact carrier for receiving the optical waveguide and at least one clamping part for securing the optical waveguide in the contact carrier,
    wherein the clamping part has a first clamping section for clamping the covering of the optical waveguide and a second clamping section for clamping the fiber of the optical waveguide.

2. Optical waveguide plug part according to claim 1, in which the first clamping section has blade elements for cutting into the covering of the optical waveguide.

3. Optical waveguide plug part according to claim 2, in which the second clamping section has blade elements for cutting into the fiber of the optical waveguide.

4. Optical waveguide plug part according to claim 3, in which the blade elements are substantially perpendicular to the direction in which the optical waveguide can be inserted or is inserted into the optical waveguide plug part.

5. Optical waveguide plug part according to claim 4, in which the blade elements have, in cross-section, a barb-like profile.

6. Optical waveguide plug part of an optical waveguide plug connector for an optical waveguide, which has a fiber surrounded by a covering, the optical waveguide plug part comprising a contact carrier for receiving the optical waveguide and at least one clamping part for securing the optical waveguide in the contact carrier,
    wherein the clamping part and/or the contact carrier are at least partly transparent and/or translucent, and wherein the clamping part has a first clamping section for clamping the covering of the optical waveguide and a second clamping section for clamping the fiber of the optical waveguide.

7. Optical waveguide plug part according to claim 6, in which the clamping part is completely transparent and/or translucent.

8. Optical waveguide plug part according to claim 6, in which the contact carrier is transparent and/or translucent at least in the region of the receiving section for the clamping part.

9. Optical waveguide plug part according to claim 6, in which the clamping part and/or the contact carrier has a colour marking for identifying the position of the optical waveguide in the optical waveguide plug part.

10. Optical waveguide plug part of an optical waveguide plug connector for an optical waveguide, which has a fiber surrounded by a covering, the optical waveguide plug part comprising a contact carrier for receiving the optical waveguide and at least one clamping part for securing the optical waveguide in the contact carrier,
wherein at least one seal is arranged on the clamping part, and wherein the clamping part has a first clamping section for clamping the covering of the optical waveguide and a second clamping section for clamping the fiber of the optical waveguide.

11. Optical waveguide plug part according to claim 10, in which the seal is an O-ring seal.

12. Optical waveguide plug part according to claim 10, in which the clamping part has a flange for holding the seal.

13. Optical waveguide plug part according to claim 10, in which the clamping part has a groove for holding the seal.

14. Optical waveguide plug part according to claim 10, in which the contact carrier has a groove for holding the seal.

15. Optical waveguide plug part according to claim 10, in which the contact carrier has a step for holding the seal.

16. Optical waveguide plug part according to claim 10, wherein the clamping part comprising the first clamping section and the second clamping section is a unitary structure, and wherein the seal is arranged along an opening of the contact carrier through which the clamping part is arranged or can be arranged for securing the optical waveguide, and wherein the first clamping section and the second clamping section pass through the seal when the clamping part is arranged through the opening.

17. Optical waveguide plug part of an optical waveguide plug connector for an optical waveguide, which has a fiber surrounded by a covering, the optical waveguide plug part comprising a contact carrier for receiving the optical waveguide and at least one clamping part for securing the optical waveguide in the contact carrier, in which a seal is provided which is arranged in such a way that the fiber of the optical waveguide can be inserted through the seal, and wherein the clamping part has a first clamping section for clamping the covering of the optical waveguide and a second clamping section for clamping the fiber of the optical waveguide.

18. Optical waveguide plug part according to claim 17, in which the contact carrier has a lateral opening for receiving the at least one clamping part.

19. Optical waveguide plug part according to claim 17, in which the outer contour of the clamping part substantially corresponds to the outer contour of the contact carrier.

20. Optical waveguide plug part according to claim 17, in which the outer contour of the clamping part is substantially flat.

21. Optical waveguide plug part according to claim 17, in which the outer contour of the clamping part is arched.

22. Optical waveguide plug part according to claim 17, in which the contact carrier has a cross-section which is substantially round, oval, elliptical or rectangular (preferably having rounded corners).

23. Optical waveguide plug part according to claim 17, in which the contact carrier has a cross-section which is asymmetrical.

24. Optical waveguide plug part according to claim 1, in which the fiber has a core of optically transparent material having little attenuation and a sheath which surrounds the core and has a lower refractive index than the core, and insulation preferably being provided around the sheath.

25. Optical waveguide plug part according to claim 1, in which the core is formed from plastic or glass.

26. Optical waveguide plug part according to claim 1, in which the contact carrier has a tube which is preferably formed for receiving the fiber or the core of the fiber of the optical waveguide.

27. Optical waveguide plug part according to claim 1, in which the optical waveguide plug part has a cap which has a passage for the optical waveguide and can preferably be connected water-tight to the contact carrier.

28. Optical waveguide plug part according to claim 1, in which the contact carrier comprises a tube for receiving the fiber and a bead surrounding the tube and through which the tube passes the bead of the contact carrier engaging with a counter-plug part, the counter-plug part having a shaft for receiving the tube and having a snap edge surrounding the shaft for securing the bead of the contact carrier, and wherein the tube optically couples with a transmission element or receiving element of the counter-plug part on engaging the contact carrier of the optical waveguide plug part with the counter-plug part.

29. Optical waveguide plug part according to claim 1, in which the optical waveguide plug part has the peg or the pegs or a receptacle part of a bayonet coupling.

30. Optical waveguide plug part according to claim 1, in which the clamping part is formed from metal and/or plastic.

31. Optical waveguide plug part according to claim 1, in which the clamping part is a diecast part.

32. Optical waveguide plug part according to claim 1, in which the contact carrier is formed from metal and/or plastic.

33. Optical waveguide plug part according to claim 3, in which the clamping part is a unitary structure comprising the first clamping section, the second clamping section, and a shoulder formed between the first clamping section and the second clamping section for restricting axial movement of the optical waveguide, wherein the covering of the optical waveguide comprises a first outer diameter and an exposed portion of the fiber comprises a second outer diameter, the first outer diameter being greater than the second outer diameter, and wherein the blade elements of the first clamping section cut into the covering of the optical waveguide and the blade elements of the second clamping section cut into the exposed portion of the fiber of the optical waveguide to secure the optical waveguide in the contact carrier with the clamping part inserted into an opening of the contact carrier.

34. Optical waveguide plug part according to claim 1, in which a cap and the contact carrier are formed as one part.

35. Optical waveguide plug part according to claim 1, in which the clamping part and a seal are formed as one part.

36. Optical waveguide plug part according to claim 1, in which the contact carrier and a seal are formed as one part.

37. Optical waveguide plug part according to claim 1, in which the contact carrier has thread sections for screwing in the covering and/or the fiber of the optical waveguide.

38. A strapping plug comprising at least one optical waveguide plug part, each optical waveguide plug part being an optical waveguide plug connector for an optical waveguide, which has a fiber surrounded by a covering, and each optical waveguide plug part comprising a contact carrier for receiving the optical waveguide and at least one clamping part for securing the optical waveguide in the contact carrier, wherein the clamping part has a first clamping section for clamping the covering of the optical waveguide and a second clamping section for clamping the fiber of the optical waveguide.

39. Strapping plug according to claim 38, wherein the strapping plug comprises two optical waveguide plug parts.

40. Strapping plug according to claim 39, in which the clamping parts of the two optical waveguide plug parts are connected to one another.

41. Strapping plug according to claim 39, in which the clamping parts of the two optical waveguide plug parts are formed as one piece.

42. Strapping plug according to claim 39, in which the clamping parts of the two optical waveguide plug parts are rigidly connected to one another.

43. Strapping plug according to claim 39, in which the clamping parts of the two optical waveguide plug parts are arranged opposite one another.

44. Strapping plug according to claim 39, in which the clamping parts of the two optical waveguide plug parts are flexibly connected to one another.

45. An optical waveguide plug connector comprising an optical waveguide plug part and a counter-plug part, the optical waveguide part being an optical waveguide plug connector for an optical waveguide, which has a fiber surrounded by a covering, the optical waveguide plug part comprising a contact carrier for receiving the optical waveguide and at least one clamping part for securing the optical waveguide in the contact carrier, wherein the clamping part has a first clamping section for clamping the covering of the optical waveguide and a second clamping section for clamping the fiber of the optical waveguide.

46. Optical waveguide plug connector according to claim 45, in which the counter-plug part has a shaft for receiving the tube or the core of the optical waveguide.

* * * * *